Figure 1:
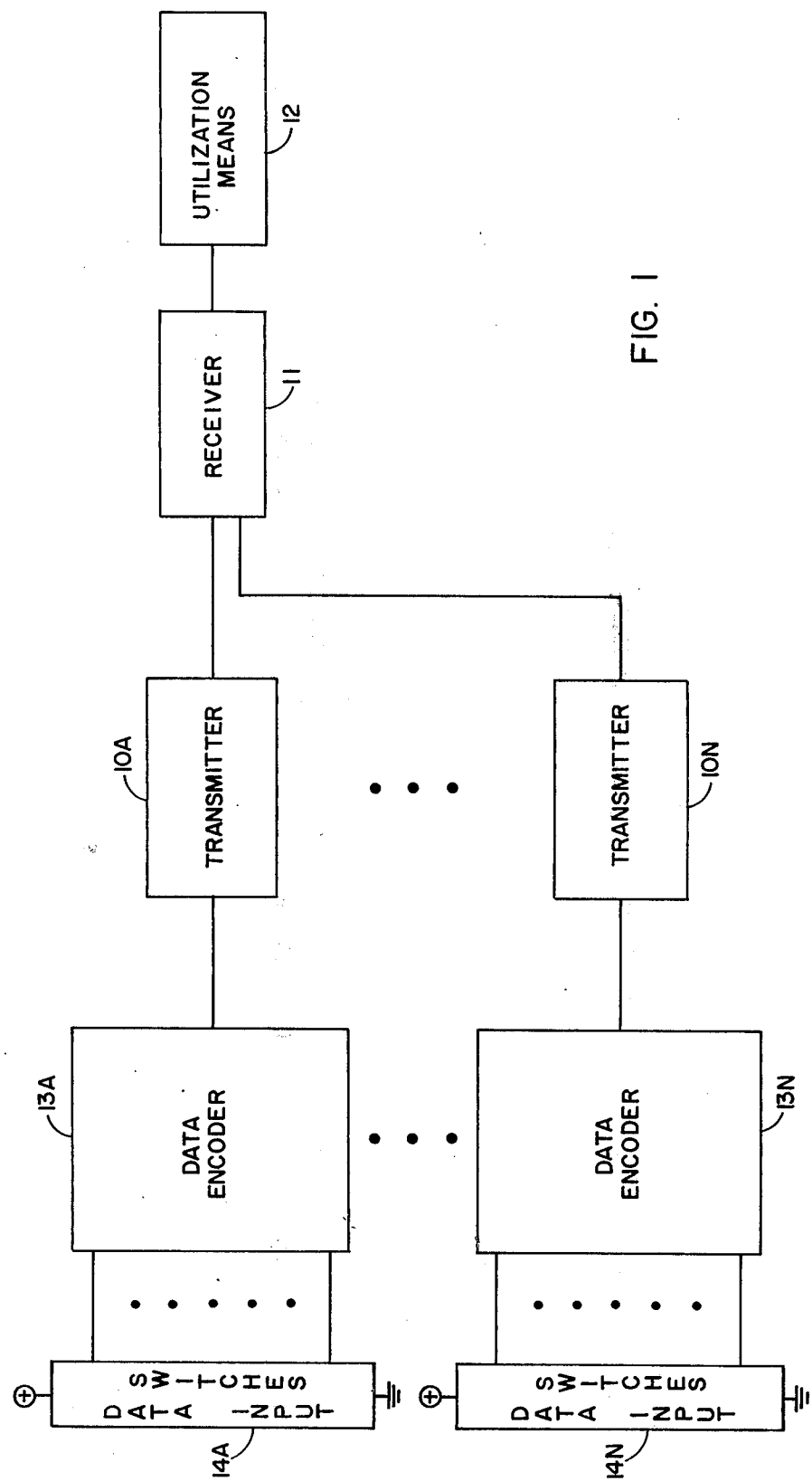

United States Patent [19]
Winkelmann et al.

[11] 3,952,298
[45] Apr. 20, 1976

[54] CLOCK GATED DIGITAL DATA ENCODING CIRCUIT

[75] Inventors: Earl R. Winkelmann; Robert S. Briggs, Jr., both of Richardson, Tex.

[73] Assignee: Spectradyne, Inc., Richardson, Tex.

[22] Filed: Apr. 17, 1975

[21] Appl. No.: 569,054

[52] U.S. Cl. .................. 340/347 DD; 179/15 A
[51] Int. Cl.² .................. H03K 13/24; H04J 6/00
[58] Field of Search ......... 179/15 BY, 15 A, 15 BA, 179/15 BS; 178/66, 68; 340/347 DD, 345, 350, 147 R, 147 MD

[56] References Cited
UNITED STATES PATENTS

| | | |
|---|---|---|
| 3,300,759 | 1/1967 | Chapman et al. ........... 340/147 MD |
| 3,697,698 | 10/1972 | Oswald et al. ............... 179/15 A |
| 3,833,757 | 9/1974 | Kirk et al. ................... 179/15 A |
| 3,860,908 | 1/1975 | Stratton ...................... 340/347 DD |

*Primary Examiner*—Thomas A. Robinson
*Attorney, Agent, or Firm*—Warren H. Kintzinger

[57] ABSTRACT

A digital data encoding circuit for use in a one-way transmission system utilizes three 8-bit multiplexers to generate and transmit a 64-bit message. Each bit in the message comprises a 4-chip, or time slot, code that includes an embedded clock therein. The encoding circuit repetitively generates the 64-bit coded message but only enables transmission of one message during periodically recurring intervals. In the event a priority message is sensed, the time between the intervals is reduced so that the rate of message transmission is increased.

7 Claims, 3 Drawing Figures

CLOCK GATED DIGITAL DATA ENCODING CIRCUIT

This invention relates in general to one-way data transmission systems and, in particular, to a data encoding circuit adapted for use in a one-way digital data transmission system.

There are a number of applications for one-way data transmission systems. For example, many hotels provide the service of transmitting various movies, or special events such as sporting attractions, over an unused TV channel to rooms desiring such entertainment. A one-way data transmission system may then be utilized to automatically report the TV channel in use, the room number identification, and certain other specialized features such as fire and burglary alarms to a central receiver. At the central receiver, the information is utilized to charge the customer for the special entertainment, or to alert the proper authorities in the event of fire or burglary. In such a system, a multiplicity of transmitting units are typically provided - usually one per room. These transmitting units are asynchronous, with respect to one another and to the receiver, and continually transmit information to the central receiver, repetitively at predetermined intervals. In such a system, it is important that the central receiver accurately interpret the incoming information thereto. Because the system is asynchronous, means must be provided to frame the transmitted information so that the receiver unit can unambiguously decode it. Another constraint on the system design is one of economics, however, and since the system may be utilized in an application having on the order of one thousand separate transmitters, an optimum design must be very cost effective, with no deterioration of the interpretation reliability.

It is therefore a principal object of this invention to provide a data encoding circuit for use in a one-way data transmission system.

Another object is to provide such a circuit whereby a receiver can unambiguously interpret transmitted data.

A further object is to provide a data encoding circuit which accepts as input data, high priority emergency information, and transmits such information at an accelerated rate.

A still further object is to provide a highly efficient and cost effective data encoding circuit to satisy all of the above objectives.

Features of this invention useful in accomplishing the above objectives include, a clock gated digital data encoding circuit which transmits a 64-bit message. Each message bit is encoded as a 4-chip code which includes an embedded clock. Three 8-bit multiplexers are clock-gated to form a 64-bit message which includes a header portion, a code portion, and redundant data portions. This message is repeated at regular intervals under clock control. In the event a priority emergency message must be transmitted, the clock is reset at shortened intervals, causing transmission to occur at an accelerated rate.

A specific embodiment representing what is presently regarded as the best mode of carrying out the invention is illustrated in the accompanying drawings.

Figure 2:
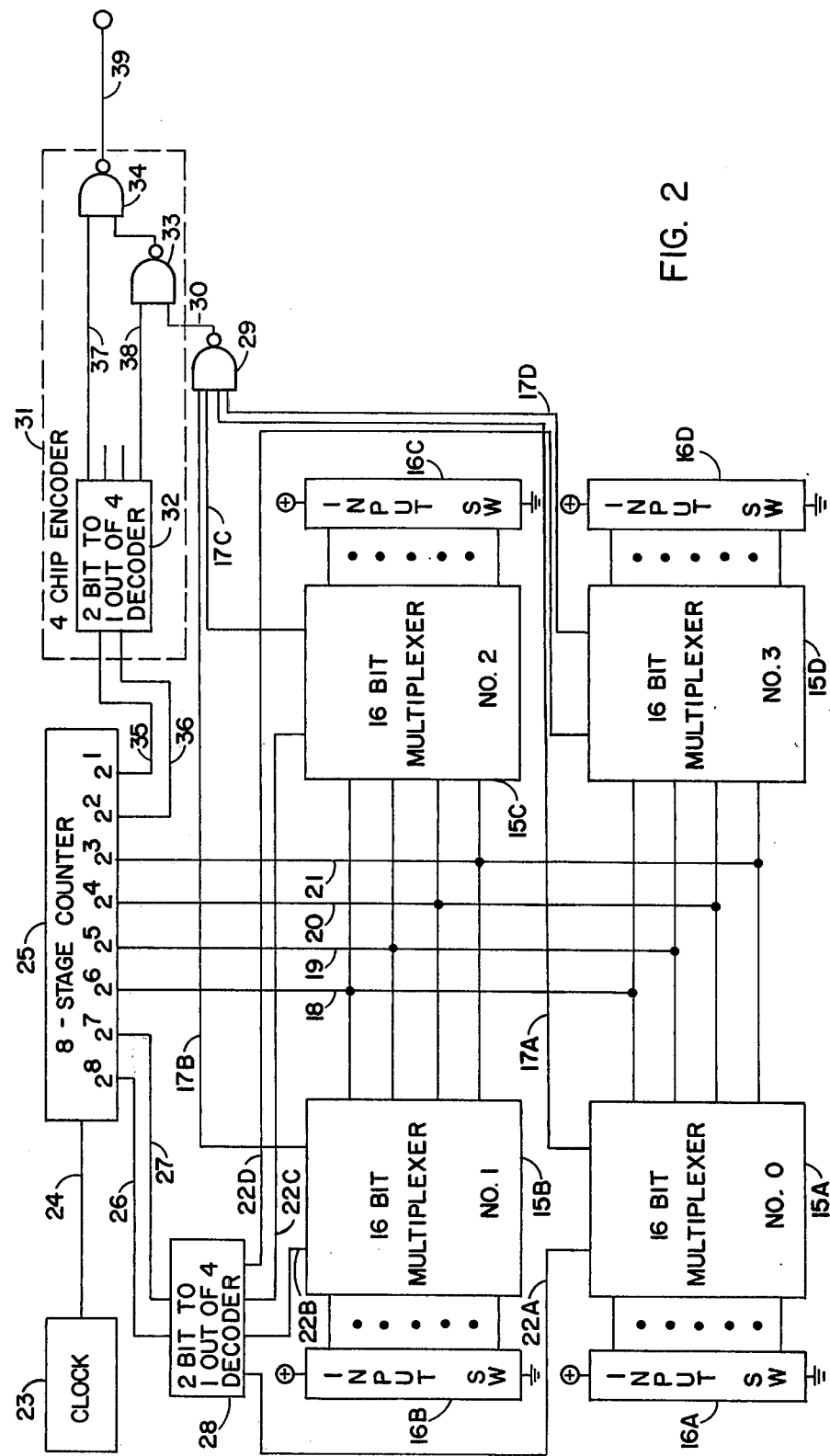
Figure 3:
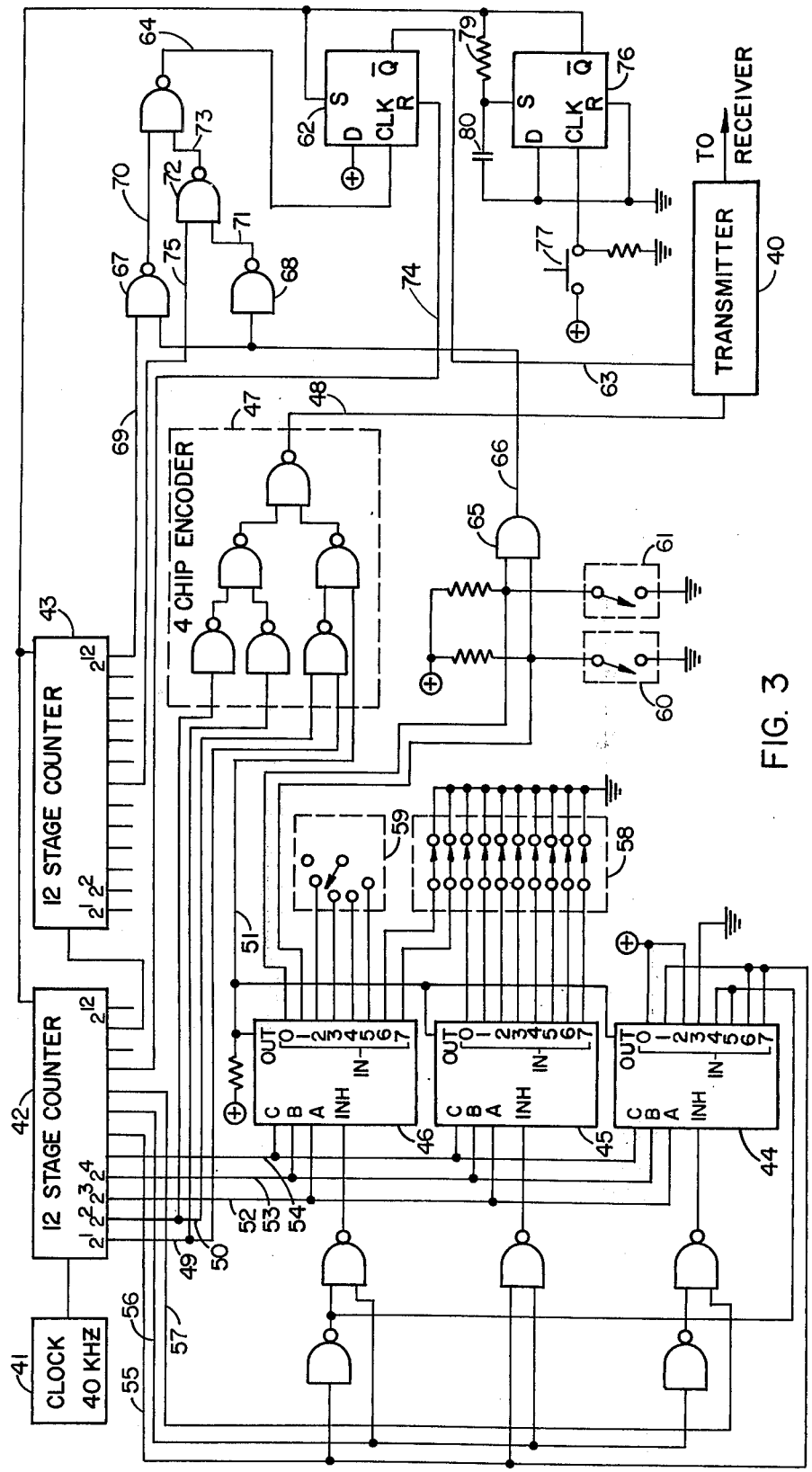

In the drawings:

FIG. 1 represents a block schematic diagram of a one-way data transmission system in which this invention may be utilized;

FIG. 2, a block schematic diagram of a clock-gated digital data encoding circuit, according to this invention; and FIG. 3, a detailed schematic of a circuit constructed in accordance with, and embodying the principles of this invention.

Referring to the drawings:

In the one-way data transmission system shown in FIG. 1, a plurality of transmitters 10A–10N, transmit to a single receiver 11 connected to utilization means 12. Utilization means 12 may be a processor in a hotel which bills customers in accordance with the information transmitted from each of the rooms, and as such forms no part of this invention. Each of the transmitters 10A–10N is in a different hotel room. Associated with each of the transmitters 10A–10N, is a respective data encoder 13A–13N. Connected to each of the data encoders 13A–13N is a respective bank of data input switches 14A–14N. These switches connect either battery or ground to its respective data encoder in a format identifying the particular room and the particular information to be transmitted. For example, a bank of switches may be preset to a code identifying the particular room. Other switches may indicate which TV channel is being used in that room, and there also may be additional switches connected to fire and/or burglary sensors. For example, U.S. Pat. Application, Ser. No. 457,087, filed Apr. 1, 1974, and assigned to the assignee of this invention, discloses an illustrative one-way data transmission system for such application. The disclosed system is a low-density, digital data, one-way transmission system wherein the individual transmitters continuously transmit, in a burst mode manner, the message inputted to the data encoder. That is, the individual messages are repetitively transmitted at regularly recurring intervals - the transmitters being asynchronous with respect to each other. Each message includes an identification of the transmitter so that utilization means 12 can accurately bill the rooms.

The block schematic shown in FIG. 2 illustrates the basic operation of a clock-gated digital data encoding circuit, according to this invention. Four 16-bit multiplexer circuits 15A, 15B, 15C, and 15D, are each connected to a respective bank of input switches 16A–16D. Each of the input switches 16A–16D provides either a battery (high), or ground (low), signal level one each of its 16 connections to its respective multiplexer 15A–15D. These high and low signals represent bits in the 64-bit transmitted message, and are arranged according to a specified format. For example, input switches 16A may provide a header, input switches 16B may provide data, input switches 16C may provide a specified code, and input switches 16D may provide data. Each multiplexer circuit 15A–15D provides on its respective output line 17A–17D one of its sixteen inputs, depending upon the decoding level of the signals on the address input lines 18, 19, 20, and 21. In addition, each multiplexer circuit 15A–15D has a respective inhibit input 22A–22D that, when high, prevents any input from appearing on the respective output line.

In the illustrative system, a logic 0 is represented by a high voltage level, and a logic 1 is represented by a low voltage level. Thus, when there is an inhibit signal applied to a particular multiplexer circuit, a high level is applied to its respective output line. The input switches apply ground to represent a logic 1, and battery to represent a logic 0, to the input of their respective multiplexer circuits.

With respect to operation of the system of FIG. 2, clock 23 is a freerunning clock which generates a square wave signal of fixed frequency on line 24. This clock signal is applied to 8-stage counter 25 that may typically comprise 8 flip-flops connected as frequency divider stages, with each stage having a corresponding output lead. The output leads of the four middle stages of counter 25 are leads 18, 19, 20, and 21, providing address input signals to multiplexers 15A–15D. These address signals cause the multiplexers to cycle their inputs sequentially to their respective outputs. The two higher order stages of counter 25 put signals on leads 26 and 27 to decoder circuit 28. Decoder 28 takes the two input bits from leads 26 and 27 and converts them to a one out of four signal which it applies to leads 22A–22D. These latter leads, 22A–22D, go to the inhibit inputs of their respective multiplexers 15A–15D. Since only one of the leads 22A–22D has a low signal on it at any given time, only one multiplexer 15A–15D is not inhibited. It is thus seen that with the cycling of counter 25, the 64-input signal applied to multiplexers 15A–15D through respective switches 16A–16D are sequentially applied to leads 17A–17D and thence to NAND gate 29 where they are inverted and placed on lead 30. In summary of the operation thus far, the 64-bit message is sequentially and repetitively applied to lead 30 in uncoded but inverted form.

NAND gate 29 is connected to 4-chip encoder circuit 31 that includes 2-bit to one out of four decoder 32 and NAND gates 33 and 34. Encoder 31 functions to divide the time that a single message bit is present on line 30 into four time slots and combine these time slots with the desired message bit to provide a unique code that can easily be framed and decoded because it contains an embedded clock. To do this, the two fastest changing stages of counter 25 have their outputs connected to 2-bit to one out of four decoder 32 through lines 35 and 36. Decoder 32 then provides signals on its output leads defining four time slots during which the bit is present on line 30. The only outputs of decoder 32 that are utilized are those that define the first time slot, on lead 37, and the fourth time slot, on lead 38. Using the symbol H to represent a high, or battery, voltage, and the symbol L to represent a low, or ground, voltage, the four-chip code generated by encoder 31 is HHHL to represent a data bit 0 and HLLL to represent a data bit 1. This code has several interesting features. First, the encoding circuit is simply constructed. Second, decoding is very simple because the only L to H transition is between 4-chip segments, thereby providing an embedded clock, that makes framing of the message very simple. Third, the decoding, itself, is simplified because the data bit 0 always has three adjacent H chips and the data bit 1 always has three adjacent L chips. It should be noted at this point that the code LLLH and LHHH, complementary to the above-described code, also has the same features and may be utilized as well, with a minor modification to encoder circuit 31. The output of encoder 31 on lead 39 may be utilized as an input to one of the transmitters 10A–10N (FIG. 1), or for any other desired purpose.

The foregoing description of the circuit of FIG. 2 illustrates the basic principles of operation of a clock-gated digital data encoding circuit according to this invention. The circuit shown in FIG. 3 utilizes those principles to provide a similar output code but has some additional features thereover. Only three 8-bit multiplexers are utilized to provide a 64-bit message. The circuit shown in FIG. 3 is designed to operate with a 64-bit message being generated and sent to transmitter 40. This 64-bit message comprises a 16-bit header word, a 16-bit data word, a 16-bit code word, and a repeat of the 16-bit data word, that takes about 13 milliseconds to transmit and is repeated on the order of once every three and one-half minutes. However, in the event that an emergency message must be transmitted, to report events such as a burglary or a fire in the room, for example, the message repetition time is reduced to about 6 and ½ seconds.

The circuit of FIG. 3 responds to signals generated by clock 41 which are decoded in various ways to control the operation of the circuitry. Clock 41 illustratively generates a 40 kilohertz square wave that is applied to twelve-stage counter 42. Twelve-stage counter 42, as well as twelve-stage counter 43, are illustratively of the type CD4040AE, manufactured by RCA Corporation. Each counter 42 and 43 consists of an input pulse shaping circuit and twelve ripplecarry binary counter stages. Resetting each counter to the all zero's state is accomplished by applying a high-level signal to the reset input. A masterslave flip-flop configuration is utilized for each counter stage with the state of the counter being advanced one step in binary order on the negative going transition of the input pulse. The circuit utilizes three 8-bit multiplexer circuits 44, 45, and 46, illustratively of the type CD4051AE manufactured by RCA Corporation. Each of these multiplexers 44, 45, and 46, is an 8-channel multiplexer having three binary control inputs (A, B, C) and an inhibit (INH) input. The three binary input signals to inputs A, B, and C, select one out of the eight input channels (0,1,–7) to be connected to the output (OUT) terminal. A high signal to the inhibit input places a high signal on the output terminal.

The three 8-bit multiplexer circuits 44, 45, and 46, are clocked in such a manner that a 64-bit message is generated. The 64-bit message is segmented into four 16-bit words. The first word is a header word and consists of a string of 16 logic ONES. The second 16 bits form a data word comprised of the inputs to multiplexers 45 and 46. The third 16 bits form a code word generated by sequencing multiplexer 44 twice. The last group of 16 bits forms a data word that is a repetition of the second group of 16 bits and is again produced by multiplexers 45 and 46. Each bit of the 64-bit message is encoded by 4-chip encoder 47 to provide the same code previously described with reference to FIG. 2. The two fastest changing outputs of counter 42 are connected to the input of encoder 47 over leads 49 and 50 to define four time slots within a single message bit. The message bits are applied to encoder 47 through line 51, connected to the outputs of multiplexers 44, 45, and 46. Encoder 47 generates the same code as was described previously for encoder 31.

The outputs of the third, fourth, and fifth stages of counter 42, on lines 52, 53, and 54, respectively, are connected to the A, B, C, inputs of multiplexers 44, 45, and 46, to sequentially connect the input terminals 0–7 of the multiplexers to the respective output channels. The sixth, seventh, and eighth stages of counter 42, on lines 55, 56, and 57, respectively, are utilized to inhibit the outputs of multiplexers 44, 45, and 46, in the following sequence. For the first 16 bits of the 64-bit message, all three multiplexers 44, 45, and 46, are inhibited so that there is a HIGH signal on lead 51. For the next 8 bits of the message, the outputs of multiplexers 44 and 46 are inhibited, and for the following 8 bits of the message, the outputs of multiplexers 44 and 45 are inhibited. Therefore, the second 16 message bits are comprised of the 16 inputs, sequentially, to multiplexers 45 and 46. For the third 16 bits of the 64-bit message, multiplexers 45 and 46 are inhibited, and the inputs to multiplexer 44 are changed after 8 bits to generate the logical sequence 1 0 1 0 1 1 0 0 1 1 0 0 0 1 1. The last 16-bit segment of the 64-bit message is the same as the second 16-bit segment and is generated by inhibiting the output of multiplexers 44 and 46 for the first 8 bits, and then the outputs of multiplexers 44 and 45 for the final 8 bits. The 64-bit message generated as just described is applied 4-chip encoder 47 over lead 51, where it is encoded as a 4-chip per bit sequential code on lead 48 and applied to transmitter 40. Transmitter 40 is illustratively a frequency shift key (FSK) transmitter such as type XR210 manufactured by EXAR Corporation.

The data inputs to multiplexers 45 and 46 are illustratively the room number identification, a one out of four movie selection, and two emergency inputs such as fire or unauthorized entry of a hotel room. Switch bank 58 illustratively comprises ten single pole, single throw switches that may be preset to provide a binary indication of a particular room number. With ten switches in switch bank 58, as shown in FIG. 3, there is a capacity for identifying 1024 rooms. Switch 59 is illustratively shown as a rotary selector switch having five positions, four of which indicate a particular movie or special event selected to be viewed in the room, and the fifth, that is not connected to multiplexer 46, indicates that the television is connected to a regular TV channel. Switches 60 and 61 are emergency sensors, that are of any known type, to detect, for example, a fire in a room, or an unauthorized entry into a room, apply a ground to the respective inputs to multiplexer 46 in the event of either of those two emergency situations.

From the previous discussion, it is seen that a 64-bit message is repetitively applied to transmitter 40 in a 4-chip code format. The repetition period, using a 40 kilohertz clock 41 is 12.8 milliseconds. However, it is desired to actually transmit the 64-bit message only once every three and one-half minutes. To that end, flip-flop 62 is provided, illustratively a D-type flip-flop, such as type CD4013 manufactured by RCA Corporation. This flip-flop has independent data (D), set (S), reset (R), and clock (CLK) inputs, and Q and $\overline{Q}$ outputs. The logic level present at the D input is transferred to the Q output during the positive going transition of the signal applied to the clock input. Setting or resetting is independent of the clock and is accomplished by a high level applied to the set or reset line, respectively. The $\overline{Q}$ output of flip-flop 62 on line 63 is applied to the enable input of transmitter 40. Although continually accepting input on line 48, transmitter 40 only transmits when the signal on line 63 is low. The setting and resetting of flip-flop 62 is as follows. Since battery voltage is continually applied to the D input of flip-flop 62, whenever a positive-going signal appears on lead 64, flip-flop 62 is set, thereby putting a low signal on lead 63. Normally, sensors 60 and 61 are open, thereby placing high voltages on both inputs of AND gate 65 to put a high voltage on lead 66 to NAND gates 67 and 68. The other input of NAND gate 67 is connected to the twelfth state of counter 43 through lead 69. Counter 43 is arranged so that a positive-going signal appears on lead 69 every three and one-half minutes, assuming a 40 kilohertz clock 41. With a positive signal on lead 66 and a positive-going signal on lead 69, there is a negative-going signal at the output of NAND gate 67 on lead 70. Since there is a positive signal on lead 66, there is a low signal at the output of NAND gate 68 at lead 71 causing the output of NAND gate 72 to place a high signal on lead 73. Therefore, every three and one-half minutes, there is a positive-going signal applied to lead 64 setting flip-flop 62 and enabling transmitter 40. The reset input of flip-flop 62 is connected to the ninth stage of counter 42 through lead 74. The ninth stage of counter 42 provides a positive-going signal every 12.8 milliseconds, the time of a 64-bit message, to thereby reset flip-flop 62 every 12.8 milliseconds. But since flip-flop 62 is only set every 3 ½ minutes, transmitter 40 is enabled for 12.8 milliseconds every three and one-half minutes. However, in the event that one of the sensors 60 or 61 closes due to the detection of a fire or unauthorized entry condition, a low signal is applied to lead 66. With a low signal applied to lead 66, a high signal is applied to lead 71 and a high signal is also applied to lead 70. Lead 75 is connected to the seventh stage of counter 43, from which it receives a positive-going signal every 6.55 seconds, again assuming a 40 kilohertz clock 41. This positive-going signal on lead 75 causes a negative-going signal on lead 73 that in turn cause a positive-going signal on lead 64, setting flip-flop 62 every six and one-half seconds instead of three and one-half minutes. Thus, transmitter 40 is enabled for 12.8 milliseconds every 6 ½ seconds in the event of an emergency requiring a higher repetition rate of data transmission.

Flip-flop 76, which is of the same type as flip-flop 62, in conjunction with push-button 77, provides the capability of the manual initiation of message transmission. In the event that it is desired to transmit a message, push button 77 may be depressed. Since the D input of flip-flop 76 is connected to ground, when push button 77 is depressed a positive-going signal is provided to the clock input of flip-flop 76. Flip-flop 76 is put in its reset state with its $\overline{Q}$ output providing a high signal on lead 78 to thereby reset counters 42 and 43 and set flip-flop 62, initiating a message transmission. The positive-going signal on lead 78 is also fed to the set input of flip-flop 76 through resistor 79 to return its $\overline{Q}$ output to a low-level.

Whereas this invention is herein illustrated and described with respect to a specific embodiment thereof, it should be realized that various changes may be made without departing from the essential contributions to the art made by the teachings hereof.

We claim:

1. A digital data encoding circuit connected to a multibit source of input digital data signals including: multiplexer means comprising a plurality of addressable input terminals connected to said data source, an output terminal, and a plurality of address terminals; said multiplexer means being responsive to address signals applied to said address terminals for applying to said output terminal the input digital data signal applied to the input terminal corresponding to the applied address signals; clock means providing a fixed frequency clock signal; multi-stage counter means connected to said clock means, with the first stage of said counter means providing an output signal at half the frequency of said clock signal, and each succeeding stage of said counter means providing an output signal at half the frequency of the preceding stage; address means connected between said multiplexer means address terminals and the third and higher stages of said counter means for applying said address signals to sequentially address the input terminals of said multiplexer means; and encoder means having input terminals connected to said multiplexer means output terminal and the first and second stages of said counter means for encoding each bit of said data source into a four-chip binary code and applying the binary coded data to an output terminal of said encoder means.

2. The circuit of claim 1, wherein said encoder means includes: means responsive to the first and second stage counter means output signals for generating four time slot signals; means responsive to the first time slot signal for applying to said encoder means output terminal a signal at a first binary level; means responsive to the fourth time slot signal for applying to said encoder means output terminal a signal at the second binary level; and means responsive to the second and third time slot signals for applying to said encoder means output terminal a signal corresponding to the level of said each data bit.

3. In a one-way digital data transmission system wherein a plurality of switches selectively provide binary input data and a transmitter means is selectively enabled to transmit a multibit message including said data, apparatus for generating said message and enabling said transmitter including: clock means providing a fixed frequency clock signal; counter means connected to receive said clock signal; said counter means comprising a plurality of serially connected frequency divider stages, the first of said stages providing a signal at half the frequency of said clock signal and each of the succeeding stages providing a respective signal at half the frequency of the preceding stage; multiplexer means having a plurality of addressable input terminals connected to said switches, an output terminal, and a plurality of address terminals connected to receive the signals provided by the third and higher stages of said counter means; said multiplexer means applying a multibit message to said output terminal by sequentially coupling to said output terminal the input terminals identified by the signals provided by said third and higher counter means stages; encoder means connected to said multiplexer means output terminl and the first and second stages of said counter means for encoding each bit of the message on said multiplexer output terminal into a four-chip binary code wherein the first chip has a first binary value and the fourth chip has the other binary value, said encoder means providing the encoded message bits to said transmitter means; and enabling means connected to said counter means and said transmitter means for repetitively enabling said transmitter means for a first interval of time long enough to transmit said multibit message during a substantially longer second interval of time.

4. The apparatus of claim 3, wherein said plurality of switches comprises a first group of switches and a second group of switches, and further including: sensing means responsive to the closing of a switch in said first group for providing a priority signal; and means responsive to said priority signal for controlling said enabling means to shorten said second interval of time.

5. The apparatus of claim 3, wherein said encoder means includes: means responsive to the first and second stage counter means output signals for generating four time slot signals; means responsive to the first time slot signal for providing to said transmitter means a signal at a first binary level; means responsive to the fourth time slot signal for providing to said transmitter means a signal at the second binary level; and means responsive to the second and third time slot signals for providing to said transmitter means a signal corresponding to the level of said each message bit.

6. The apparatus of claim 3, wherein said enabling means includes manually operable means for resetting said counter means and enabling said transmitter means.

7. The apparatus of claim 3, wherein said multiplexer means includes, three eight-input multiplexer units having their respective output terminals connected to said multiplexer means output terminal, each of said multiplexer units including three address terminals and an inhibit terminal, a first level signal on an inhibit terminal causing a fixed level signal to appear on the respective output terminal and a second level signal on the inhibit terminal allowing the signals on the respective input terminals to appear on the output terminal in accordance with the applied address signals, the corresponding address terminals of said multiplexer units being connected to the third, fourth, and fifth stages of said counter means, and the inhibit terminals of said multiplexer units being connected to the sixth, seventh, and eighth stages of said counter means to generate a 64-bit message from the inputs to said three multiplexer units.

* * * * *